US010328941B2

(12) United States Patent
Fujii et al.

(10) Patent No.: US 10,328,941 B2
(45) Date of Patent: Jun. 25, 2019

(54) DRIVING ASSISTANCE DEVICE

(71) Applicant: HONDA MOTOR CO., LTD., Tokyo (JP)

(72) Inventors: Satoshi Fujii, Wako (JP); Haruhiko Nishiguchi, Wako (JP); Daisuke Kubota, Wako (JP); Ryohsaku Arakawa, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 15/439,302

(22) Filed: Feb. 22, 2017

(65) Prior Publication Data
US 2017/0240177 A1 Aug. 24, 2017

(30) Foreign Application Priority Data

Feb. 22, 2016 (JP) .................................. 2016-030847

(51) Int. Cl.
*B60W 30/18* (2012.01)
*B60W 50/10* (2012.01)
(Continued)

(52) U.S. Cl.
CPC ...... *B60W 30/18163* (2013.01); *B60W 50/10* (2013.01); *B62D 15/025* (2013.01);
(Continued)

(58) Field of Classification Search
CPC ....... B60W 30/18163; B60W 2540/12; B60W 2540/10; B60W 2420/52; B60W 2420/42;
(Continued)

(56) References Cited

U.S. PATENT DOCUMENTS

2005/0015203 A1* 1/2005 Nishira ................. B60W 50/16
701/301
2014/0005914 A1* 1/2014 Bernzen .............. F02N 11/0833
701/112

(Continued)

FOREIGN PATENT DOCUMENTS

JP 10-105895 A 4/1998
JP 11-345393 A 12/1999
(Continued)

OTHER PUBLICATIONS

Office Action dated Nov. 21, 2017, issued in counterpart Japanese Application No. 2016-030847, with English machine translation. (8 pages).

*Primary Examiner* — Genna M Mott
*Assistant Examiner* — Mathew Franklin Gordon
(74) *Attorney, Agent, or Firm* — Westerman, Hattori, Daniels & Adrian, LLP

(57) ABSTRACT

A driving assistance system includes a deactivation controller that controls deactivation of Automatic Lane Change (ALC) control and a second driving assistance control (such as lane keeping control). During the ALC control, the deactivation controller deactivates the ALC central when, for example, a control amount by a driver of a steering wheel or the like has exceeded a first deactivation threshold value. During the second driving assistance control, the deactivation controller deactivates the second driving assistance control when, for example, the control amount has exceeded a second deactivation threshold value. The first deactivation threshold value and the second deactivation threshold value are set to differ from each other.

9 Claims, 8 Drawing Sheets

(51) Int. Cl.
*B62D 15/02* (2006.01)
*B60W 10/04* (2006.01)
*B60W 10/18* (2012.01)
*B60W 10/20* (2006.01)

(52) U.S. Cl.
CPC .... *B62D 15/0255* (2013.01); *B60R 2300/804* (2013.01); *B60W 10/04* (2013.01); *B60W 10/18* (2013.01); *B60W 10/20* (2013.01); *B60W 2420/42* (2013.01); *B60W 2420/52* (2013.01); *B60W 2540/10* (2013.01); *B60W 2540/12* (2013.01)

(58) Field of Classification Search
CPC ...... B60W 10/20; B60W 10/18; B60W 10/04; B60W 50/10; B60R 2300/804; B62D 15/0255; B62D 15/025
See application file for complete search history.

(56) References Cited

U.S. PATENT DOCUMENTS

2016/0129831 A1* 5/2016 Liotti ..................... B60Q 1/40
 701/41
2017/0369058 A1* 12/2017 Van Dan Elzen .... B60W 10/20

FOREIGN PATENT DOCUMENTS

JP 2014-108771 A 6/2014
JP 2015-205558 A 11/2015

\* cited by examiner

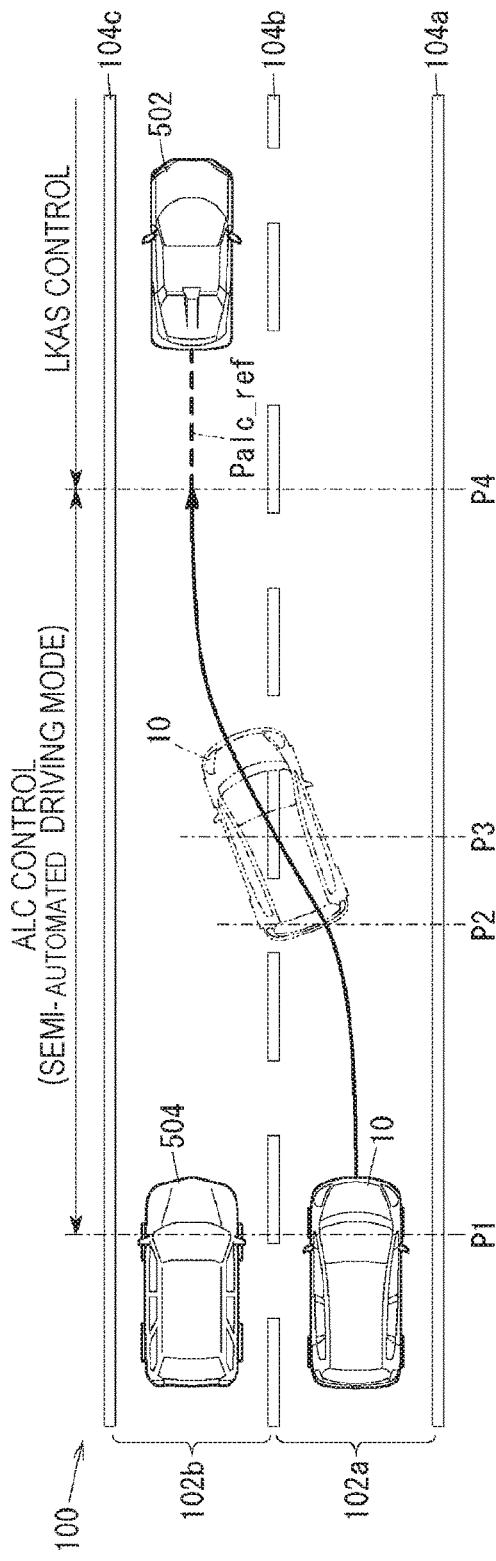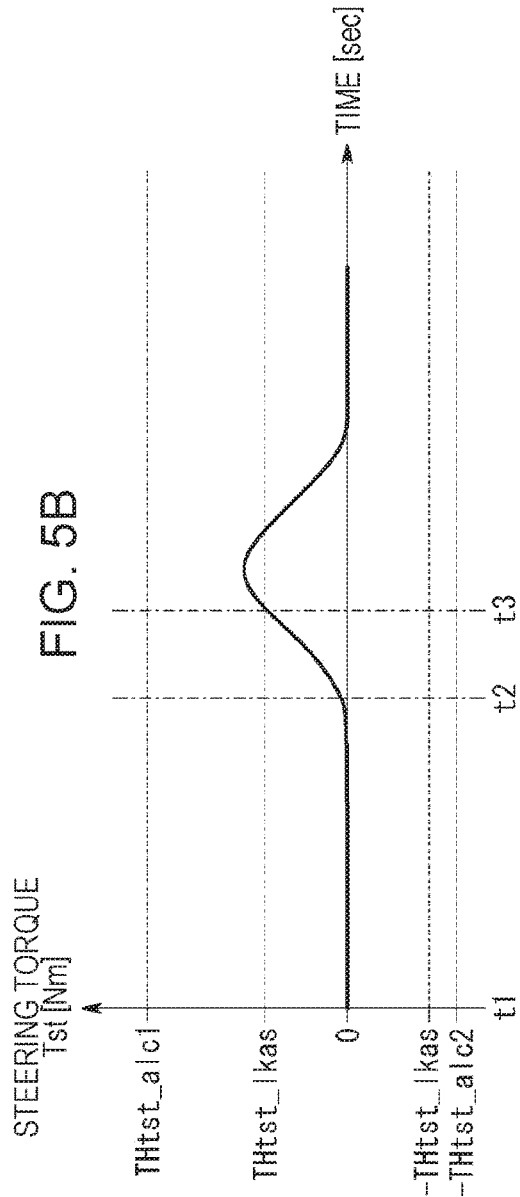

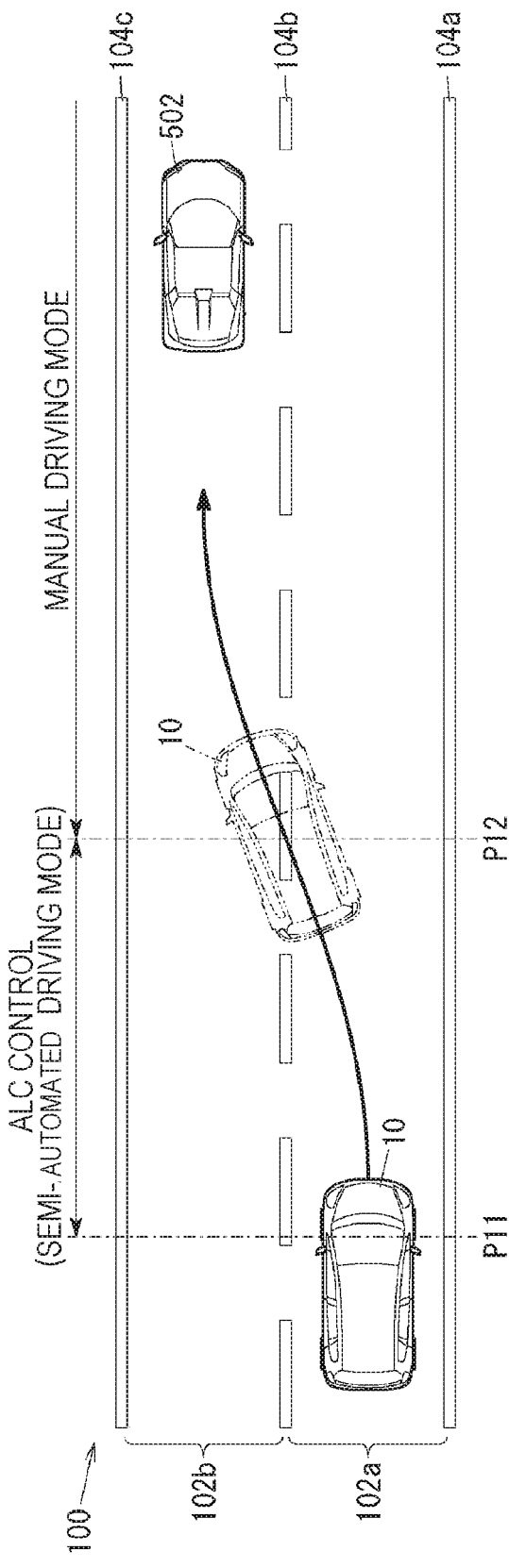
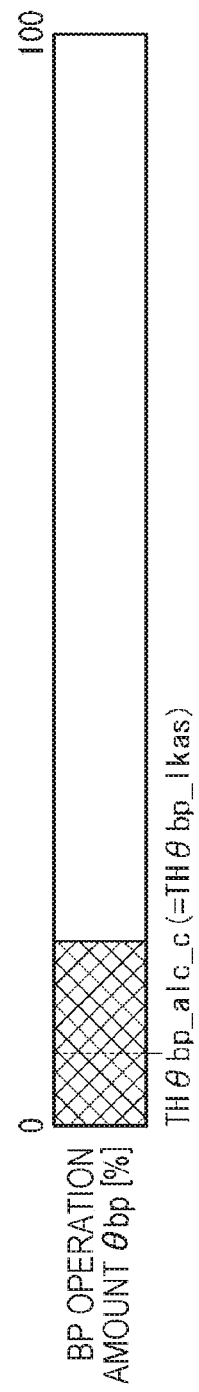

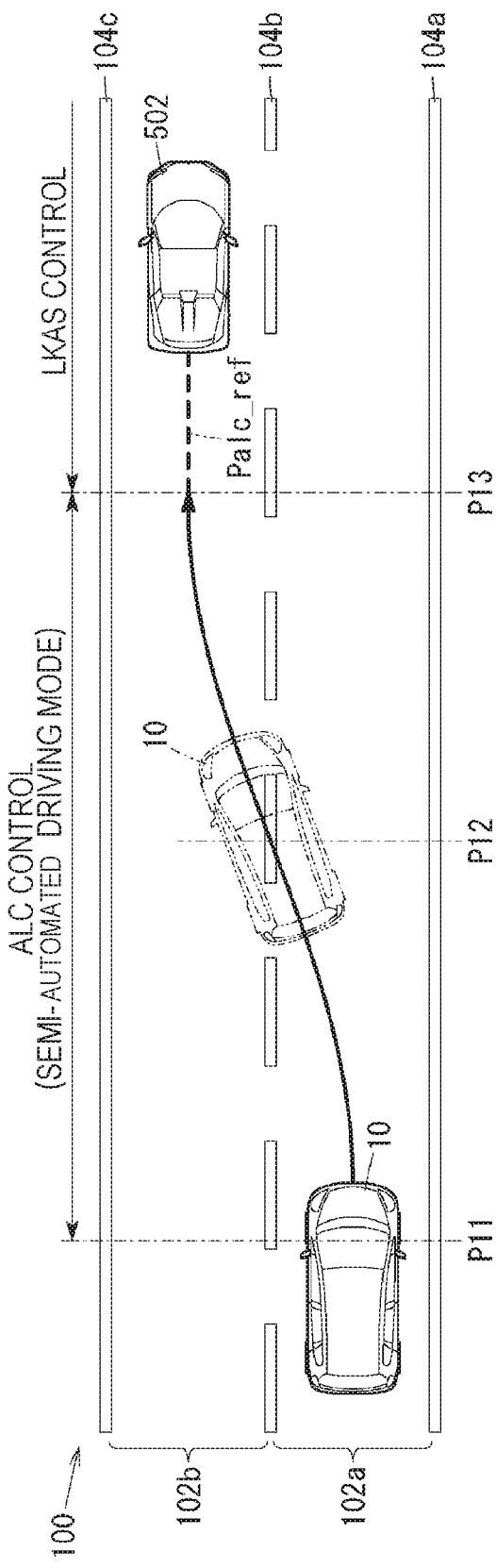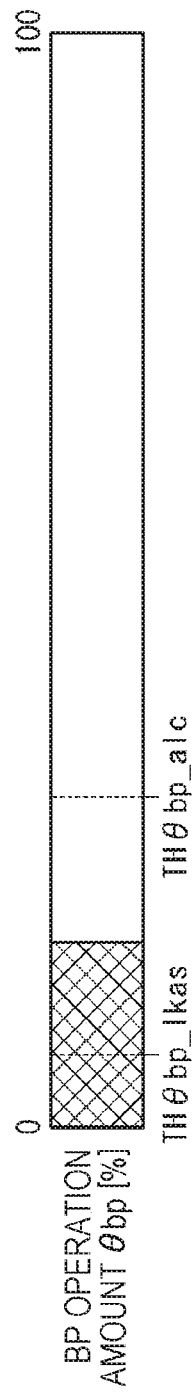

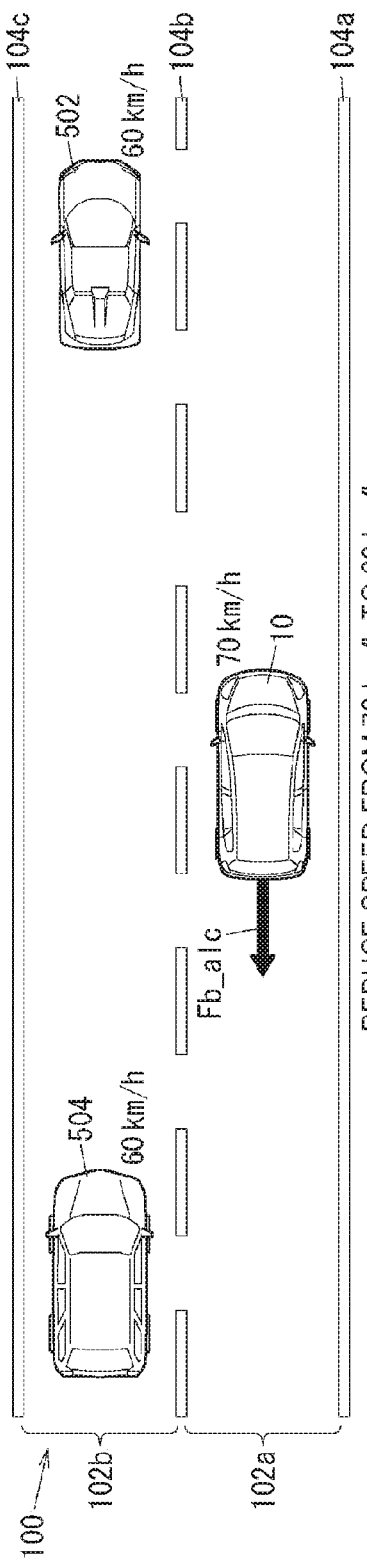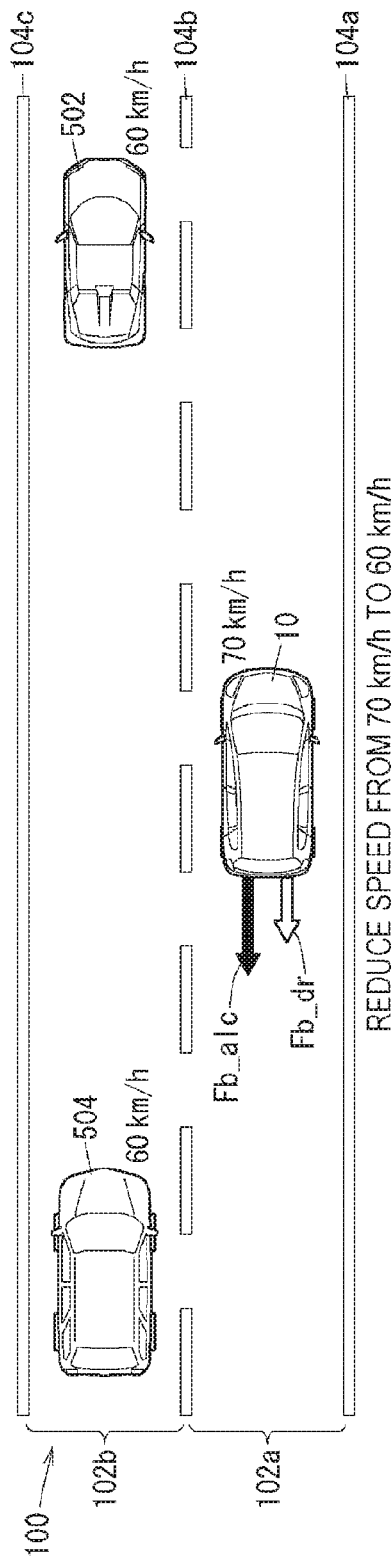

DRIVING ASSISTANCE DEVICE

CROSS REFERENCES TO RELATED APPLICATIONS

The present application claims priority under 35 U.S.C. § 119 to Japanese Patent Application No. 2016-030847, filed Feb. 22, 2916, entitled "Driving Assistance System." The contents of this application are incorporated herein by reference in their entirety.

TECHNICAL FIELD

The present disclosure relates to a driving assistance system that executes automatic lane change control as well as other driving assistance control.

BACKGROUND

Japanese Unexamined Patent Application Publication No. 10-105895 and Japanese Unexamined Patent Application Publication No. 11-345393 describe automatic driving systems that perform acceleration and deceleration control in order to facilitate merging when plural traffic lanes (lanes) merge ([0027] to [0034] in Japanese Unexamined Patent Application Publication No. 10-105895, and the abstract, [0004], [0005], [0010], [0811], [0032] in Japanese Unexamined Patent Application Publication No. 11-3453935).

SUMMARY

When plural lanes merge, it is envisaged that a driver stay want to make small adjustments to steering, acceleration, or deceleration. However, in Japanese Unexamined Patent Application Publication No. 10-105895 and Japanese Unexamined Patent Application Publication No. 11-345393, there is no discussion of small adjustments by the driver (from another perspective, of a timing at which to deactivate the driving assistance control on the vehicle side and switch to driving by the driver). Moreover, the issue of deactivating driving assistance control is not limited to when lanes merge, and is also relevant to other situations (for example, during automatic lane changing or during lane keeping control).

The present disclosure provides, for example, a driving assistance system capable setting an appropriate timing for deactivating driving assistance control and switching to driving by the driver.

A driving assistance system according to the present disclosure includes a first driving assistance controller that executes first driving assistance control or automatic lane change control so as to perform lane changing automatically when a driver's intention to change lanes has been detected, and a second driving assistance controller that executes second driving assistance control of different driving assistance control to the automatic lane change control. The driving assistance system also includes a deactivation controller that controls so as to deactivate the automatic lane change control and the second driving assistance control. The deactivation controller deactivates the automatic lane change control when a control amount by the driver of a steering wheel, a brake pedal, or an accelerator pedal, has exceeded a first deactivation threshold value during automatic lane change control, and deactivates the second driving assistance control when the control amount has exceeded a second deactivation threshold value during the second driving assistance control. The deactivation controller sets the first deactivation threshold value and the second deactivation threshold value so as to differ from each other.

According to the present disclosure, the first threshold value that determines whether or not to deactivate the automatic lane change control when the automatic lane change control is being performed, and the second threshold value that determines whether or not to deactivate the second driving assistance control when the second driving assistance control is being performed, differ from each other. This thereby enables timings to deactivate the automatic lane change control and the second driving assistance control to be set more appropriately.

The driving assistance system may include an imaging device that acquires a forward image of in front of a vehicle installed with the imaging device, and a lane marking detection section that detects a lane marking in the forward image. The second driving assistance control may be lane keeping control to keep the vehicle in a driving lane based on the lane marking detected by the lane marking detection section, and the second driving assistance controller may be a lane keeping controller that executes the lane keeping control. The deactivation controller may set the first deactivation threshold value higher than the second deactivation threshold value.

Automatic lane change control is therefore deactivated less readily than the lane keeping control. This thereby enables automatic lane changing to be continued while permitting small adjustments by the driver to steering, or to acceleration or deceleration, during automatic lane changing, to a greater extent than during lane keeping control.

The control amount may be: a steering torque, an operation speed, or an operation acceleration race of the steering wheel; or an operation amount, an operation speed, an operation acceleration rate, or a pressing force of the brake pedal; or an operation amount, an operation speed, an operation acceleration rate, or a pressing force of the accelerator pedal.

This thereby enables the automatic lane change control or the second driving assistance control to be deactivated according to direct operation of the steering wheel, the brake pedal, or the accelerator pedal by the driver.

In cases in which the control amount is a control amount of the steering wheel, the deactivation controller may set the first deactivation threshold value for a direction different to that of the lane change so as to be smaller than the first deactivation threshold value for the same direction as the lane change. This thereby enables automatic lane change control to be deactivated easily when the driver wishes to move against the first driving assistance controller that performs automatic lane change control.

BRIEF DESCRIPTION OF THE DRAWINGS

The advantages of the disclosure will become apparent in the following description taken in conjunction with the following drawings.

FIG. 5A is a diagram illustrating an example of a scenario during ALC in the present embodiment, with the lane on the left hand side of the vehicle as the target lane.

FIG. 5B is a diagram illustrating an example of ALC control deactivation threshold values and an LKAS control deactivation threshold value of the embodiment.

FIG. 6A is a diagram illustrating an example of a scenario during Automatic Lane Change in Comparative Example 2, with the driving lane on the left hand side of the vehicle as the target lane.

FIG. 6B is a diagram illustrating an example of an ALC control deactivation threshold value in Comparative Example 2.

FIG. 7A is a diagram illustrating an example of a scenario during ALC in the embodiment, with the driving lane on the left hand side of the vehicle as the target lane.

FIG. 7B is a diagram illustrating an example of the ALC control deactivation threshold value of the present embodiment.

FIG. 8A is a diagram illustrating an example of a scenario during positioning of the vehicle in the current driving lane in order to perform ALC in Comparative Example 3.

FIG. 8B is a diagram illustrating an example of a scenario during positioning of the vehicle in the current driving lane in order to perform ALC in the embodiment.

DETAILED DESCRIPTION

A. First Embodiment

A-1. Configuration

A-1-1. Overall Configuration

Figure 1:
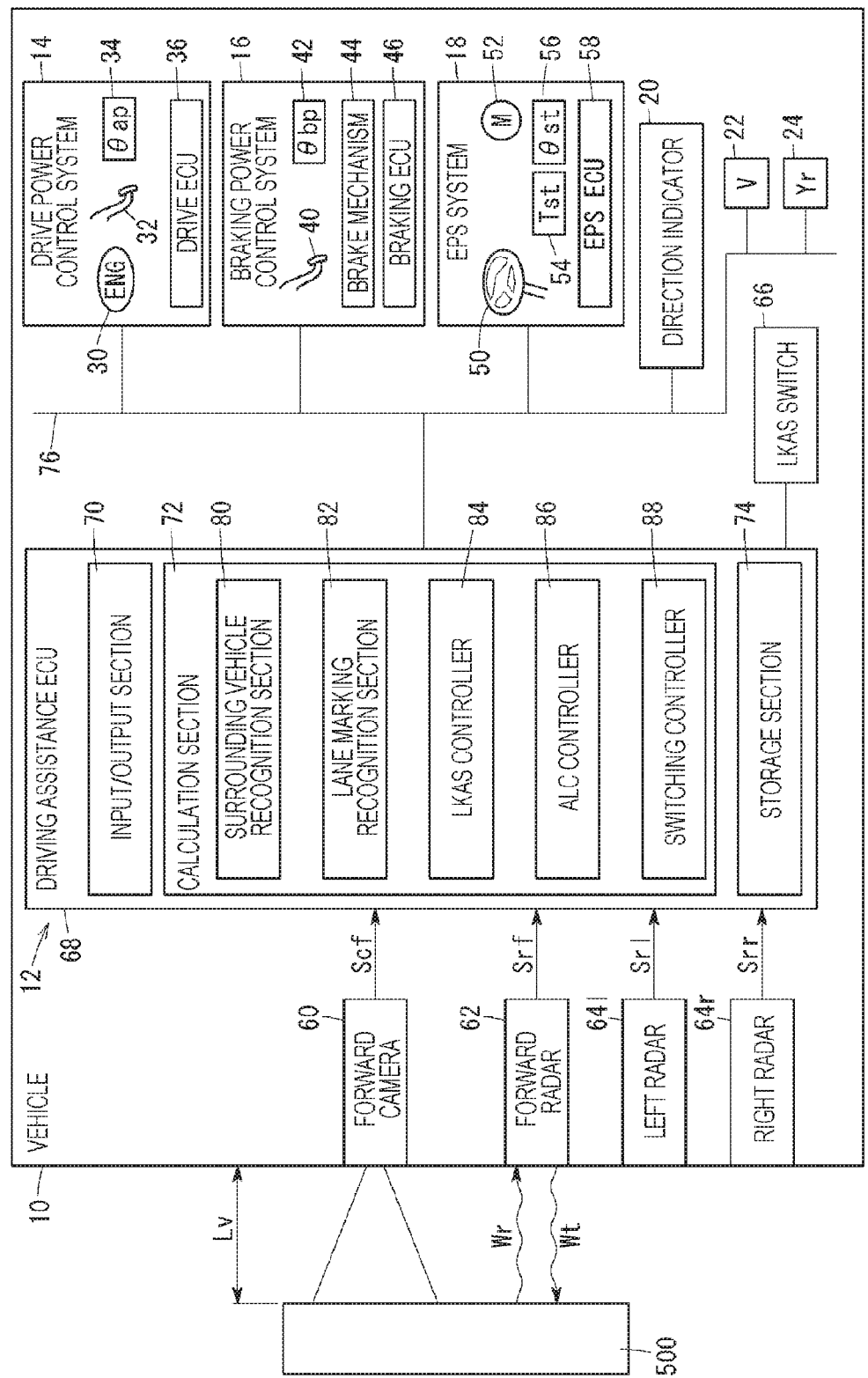
FIG. 1 is a block diagram illustrating configuration of a vehicle installed with a driving assistance system according to an embodiment of the present disclosure.

FIG. 1 is a block diagram illustrating a configuration of a vehicle 10 installed with a driving assistance system 12 according to an embodiment of the present disclosure. In addition to the driving assistance system 12, the vehicle 10 also includes a drive power control system 14, a braking power control system 16, an electrical power steering system 18 (referred to as an "EPS system 18" below), a direction indicator 20, a vehicle speed sensor 22, and a yaw rate sensor 24.

The driving assistance system 12 detects various surrounding objects 500 that appear around the vehicle 10 (for example, surrounding vehicles 502, 504 (FIG. 5A, etc.), pedestrians and walls (neither of which are illustrated)), and lane markings 104a, 104b, 104c (FIG. 5A, etc.). The driving assistance system 12 then uses the surrounding objects 500 and the lane markings 104a, 104b, 104c to assist driving of the vehicle 10. The lane markings 104a, 104b, 104c are referred to collectively as lane markings 104 below.

The drive power control system 14 includes an engine 30 (drive source), an accelerator pedal 32, an accelerator pedal operation amount sensor 34 (also referred to as the "AP sensor 34" below), and a drive electronic control unit 36 (referred to as the "drive ECU 36" below). The AP sensor 34 detects an operation amount θap (also referred to as the "AP operation amount θap" or the "operation amount θap" below) (%) of the accelerator pedal 32.

The drive ECU 36 executes drive power control of the vehicle 10 using the operation amount θap and the like. In the drive power control, the drive ECU 36 controls the engine 30 so as to control the drive power of the vehicle 10.

The drive power control of the present embodiment includes automatic cruise control (ACC). Automatic cruise control is control that causes the vehicle 10 to drive such that a vehicle speed V (km/h) matches a target vehicle speed Vtar.

The braking power control system 16 includes a brake pedal 40, a brake pedal operation amount sensor 42 (also referred to as the "BP sensor 42" below), a brake mechanism 44, and a braking electronic control unit 46 (also referred to as the "braking ECU 46" below). The BP sensor 42 detects an operation amount θbp (also referred to as the "BP operation amount θbp" or the "operation amount θbp" below) (%) of the brake pedal 40.

The braking ECU 46 executes braking power control of the vehicle 10 using the operation amount θbp and the like. In the braking power control, the braking ECU 46 controls the braking power of the vehicle 10 by controlling the brake mechanism 44 and the like.

The EPS system 18 includes a steering wheel 50, an EPS motor 52, a torque sensor 54, a steering angle sensor 56, and an EPS electronic control, unit 58 (referred to as the "EPS ECU 56" or the "ECU 58" below). The EPS motor 52 is connected anywhere between the steering wheel 50 and a vehicle wheel, not illustrated in the drawings, and applies steering assist power. The torque sensor 54 detects torque Tst (also referred to as "steering torque Tst" below) applied to the steering wheel 50 by a driver. The steering angle sensor 56 detects a steering angle θst of the steering wheel 50.

The EPS ECU 58 executes steering assist control to assist steering by the driver by generating steering assist power according to the steering torque Tst and the like.

The direction indicator 20 is a switch (blinker switch) disposed in the vicinity of the steering wheel 50, and causes direction indicator lamps on the left side (left-turn direction) and the right side (right-turn direction) to flash on and off based on driver operation. The vehicle speed sensor 22 detects the vehicle speed V of the vehicle 10 and outputs this to the driving assistance system 12 and the like. The yaw rate sensor 24 detects a yaw rate Yr of the vehicle 10 and outputs this to the driving assistance system 12 and the like.

A-1-2. Driving Assistance System 12

As illustrated in FIG. 1, the driving assistance system 12 includes a forward camera 60, a forward radar 62, side radars 64l, 64r, an LKAS switch 66 (LKAS: Lane Keeping Assist System), and a driving assistance electronic control unit 68 (also referred to as the "driving assistance ECU 68" or the "ECU 68").

A-1-2-1. Forward Camera 60

The forward camera 60 (also referred to as the "camera 60" below), serving as an imaging section, acquires images Icf (also referred to as "forward images Icf" below) of in front of the vehicle 10. Signals corresponding to the images Icf (referred to as "image signals Scf" or "signals Scf" below) are then output to the ECU 68. Detected objects 500 detected by the forward camera 60 are also referred to as "camera targets 500c" below.

Although a single forward camera 60 is employed in the present embodiment, a stereo camera may be configured by disposing two forward cameras 60 with left-right symmetry to each other. The forward camera 60 acquires the images Icf at 15 frames or more (for example, 30 frames) per second. Although the forward camera 60 is a monochrome camera that primarily uses light having a wavelength in the visible spectrum, a color camera or an infra-red camera may be employed. The forward camera 60 is, for example, disposed at a vehicle width direction central portion of a front section in the vehicle cabin of the vehicle 10 (for example, in the vicinity of the rear view mirror). Alternatively, the forward camera 60 may be disposed at a vehicle width direction central portion of a front bumper section of the vehicle 10.

A-1-2-2. Forward Radar 62 and Side Radars 64*l*, 64*r*

The forward radar 62 and the side radars 64*l*, 64*r* (also referred to as a "radars 62, 64*l*, 64*r*" below) output transmitted waves Wt, which are electromagnetic waves (millimeter waves here), to the exterior of the vehicle 10, and receives reflected waves Wr that are waves out of the transmitted waves Wt reflected back by the detected objects 500 (including, for example, the surrounding vehicles 502 and pedestrians). Detection signals corresponding to the reflected waves Wr (referred to as "reflected wave signals Srf, Srl, Srr" or "signals Srf, Srl, Srr" below) are output to the ECU 68. The signals Srf, Srl, Srr include information Ir acquired by the radars 62, 64*l*, 64*r* (also referred to as "radar information Ir" below).

The detected objects 500 detected by the radars 62, 64*l*, 64*r* are also referred to as "radar targets 500*r*" below. The side radar 64*l* is also referred to as the left radar 64*l*, and the side radar 64*r* is also referred to as the right radar 64*r*.

The forward radar 62 is disposed at the front side of the vehicle 10 (for example, on a front bumper and/or a front grill). The side radars 64*l*, 64*r* are disposed at the sides of the vehicle 10 (for example, at the sides of the front bumper). Other radars may foe additionally disposed at a rear side of the vehicle 10 (for example, on a rear bumper and/or a rear grill). A sensor such as a laser radar or an ultrasonic wave sensor may be employed instead of the radar 62 that outputs millimeter waves. Left and right side cameras may be provided in addition to the side radars 64*l*, 64*r*, or instead of the side radars 64*l*, 64*r*.

A distance Lv (FIG. 1) to a detected object 500, the type of detected object 500, and the like can be found from at least one out of the camera target 500*c* detected by the forward camera 60 or the radar target 500*r* detected by the radars 62, 64*l*, 64*r*.

A-1-2-3. LKAS Switch 66

The LKAS switch 66 is a switch with which the driver instructs the driving assistance ECU 68 to execute Lane Keeping Assist System control (LKAS control), described later. Another method (such as audio input using a non-illustrated microphone) may be employed to instruct LKAS control in addition to, or instead of, the LKAS switch 66.

A-1-2-4. Driving Assistance ECU 68

The driving assistance ECU 68 controls the overall driving assistance system 12, and, as illustrated in FIG. 1, includes an input/output section 70, a calculation section 72, and a storage section 74.

The image signals Scf from the camera 60, and the reflected wave signals Srf, Srl, Srr from the radars 62, 64*l*, 64*r*, are supplied to the driving assistance ECU 68 via the input/output section 70. Communication between the driving assistance ECU 68 and the drive ECU 36, the braking ECU 46, and the EPS ECU 58, is performed via the input/output section 70 and communication lines 76. The input/output section 70 includes a non-illustrated A/D converter circuit that converts input analog signals into digital signals.

The calculation section 72 makes calculations based on the signals from various sensors, the respective ECUs 36, 46, 58, and the like. Based on the calculation results, the calculation section 72 generates signals for the drive ECU 36, the braking ECU 46, and the EPS ECU 58. The various sensors referred to here include the camera 60, the radars 62, 64*l*, 64*r*, the direction indicator 20, the AP sensor 34, the BP sensor 42, the torque sensor 54, and the steering angle sensor 56.

As illustrated in FIG. 1, the calculation section 72 includes a surrounding vehicle recognition section 80, a lane marking recognition section 82, an LKAS controller 84, an ALC controller 86 (ALC: Automatic Lane Change), and a switching controller 88. These respective sections are implemented by executing a program stored in the storage section 74. The program may be supplied from an external source via a non-illustrated wireless communication device (such as a mobile phone, or a smartphone). Some of the program may also be configured using hardware (circuit components).

The surrounding vehicle recognition section 80 recognizes the surrounding vehicles 502, 504 (FIG. 5A, etc.) based on the camera information Ic from the camera 60, and the radar information Ir from the radars 62, 64*l*, 64*r*, and outputs information Iav (also referred to as "surrounding vehicle information Iav" below) relating to the surrounding vehicles 502, 504.

The lane marking recognition section 82 recognizes the lane markings 104*a*, 104*b*, 104*c* (FIG. 5A, etc.) based on the camera information Ic (surroundings images Ica) from the camera 60, and outputs information Ilm (also referred to as "lane marking information Ilm" below) relating to the lane markings 104*a*, 104*b*, 104*c*.

The LKAS controller 84 (lane keeping controller, second driving assistance controller) performs Lane Keeping Assist System control (LKAS control) of the vehicle 10 based on the surrounding vehicle information Iav from the surrounding vehicle recognition section 80, and the lane marking information Ilm from the lane marking recognition section 82.

In LKAS control, the LKAS controller 84 computes a torque target value (referred to as the "target LKAS torque Tlkas_tar" or the "target torgue Tlkas_tar" below) of the EPS motor 52. The target torgue Tlkas_tar is the torque required in order to keep the vehicle 10 at a reference position Plkas_ref in the lane, out of driving lanes 102*a*, 102*b* (referred to collectively as the "driving lanes 102" below) (FIG. 5A, etc.), in which the vehicle 10 is driving.

The ALC controller 86 (lane change controller, first driving assistance controller) performs Automatic Lane Change control (ALC control) of the vehicle 10 based on the surrounding vehicle information Iav from the surrounding vehicle recognition section 80, and the lane marking information Ilm from the lane marking recognition section 82. In ALC control, the ALC controller 86 computes a torque target value (referred to as the "target ALC torque Talc_tar" or the "target torque Talc_tar" below) of the EPS motor 52, and a drive power Fd and braking power Fb of the vehicle 10, required in Automatic Lane Changing (ALC).

The switching controller 88 (deactivation controller) executes switching processing to switch between a manual driving mode in which steering and acceleration/deceleration are controlled by the driver, and a semi-automated driving mode (partially automated driving mode) in which some or all of the steering and acceleration/deceleration are performed automatically controlled by the LKAS control or the ALC control. In other words, the switching controller 88 controls deactivation of the LKAS control and the ALC control.

The storage section 74 is configured by, for example, Random Access Memory (RAM) that stores imaging signals that have been converted into digital signals, temporary data entailed by various types of calculation processing, and the like, and Read Only Memory (ROM) that stores executable programs, tables, maps, and the like.

A-2. Various Control

A-2-1. Overview

As described above, the LKAS controller 84 of the present embodiment executes LKAS control. The LKAS control is control to keep the vehicle 10 at the reference position Plkas_ref within the driving lane 102 of the vehicle 10 (FIG. 5A, etc.). Note that the reference position Plkas_ref indicates a width direction position in the driving lane 102. A reference line (target path) is formed by extending the reference position Plkas_ref along the direction of travel of the vehicle 10.

The ALC controller 86 executes ALC control. The ALC control is control to automatically move the vehicle 10 to the lane 102 on a side indicated by the direction indicator 20 (on the left side or right side) with respect to the driving lane 102 of the vehicle 10.

The switching controller 88 executes switching processing to switch between the manual driving mode in which steering and acceleration/deceleration are controlled by the driver, and the semi-automated driving mode (partially automated driving mode) in which some or all of the steering and acceleration/deceleration are controlled by the LKAS control or the ALC control. Either the LKAS control or the ALC control is performed selectively in the semi-automated driving mode.

In switching processing, the switching controller 88 employs control amounts u to determine deactivation of the ALC control or the LKAS control. In the present embodiment, the steering torque Tst and the BP operation amount θbp are employed as the control amounts u (this will be described in detail later with reference to FIG. 2, FIG. 3, etc.).

A-2-2 LKAS Control

In the LKAS control, the burden of driving is alleviated by assisting operation of the steering wheel 50 so as to drive along the reference line formed from the reference position Plkas_ref of the driving lane 102. In order to achieve this, the LKAS controller 84 controls drive power of the vehicle 10 from the engine 30 and the braking power of each of the vehicle wheels from the brake mechanism 44, and controls the steering angle θst of the steering wheel 50 using the EPS motor 52.

Namely, the LKAS controller 84 outputs a steering angle θst instruction to the EPS ECU 58 such that the vehicle 10 drives at the reference position Plkas_ref of the driving lane 102. The target LKAS torque Tlkas_tar is employed when controlling the steering angle θst for LKAS control. Moreover, the LKAS controller 84 may also output engine 30 operation instructions to the drive ECU 36 and brake mechanism 44 operation instructions to the braking ECU 46 in order to handle driving on curved roads or the like.

The reference position Plkas_ref of the present embodiment is a point on a center line of the driving lane 102. Alternatively, the reference position Plkas_ref may be set at a position offset from the center line by a specific distance in the width direction.

A-2-3. ALC Control

The ALC control moves the vehicle 10 automatically to the lane 102 on the side of the driving lane 102 of the vehicle 10 indicated by the direction indicator 20 (on the left side or the right side). In order to achieve this, the ALC controller 86 controls the drive power of the vehicle 10 using the drive ECU 36, and controls the steering angle θst using the EPS ECU 58. The target ALC torque Talc_tar is employed to control the steering angle θst for ALC control.

A-2-4. Driving Mode Switching Control

Figure 2:
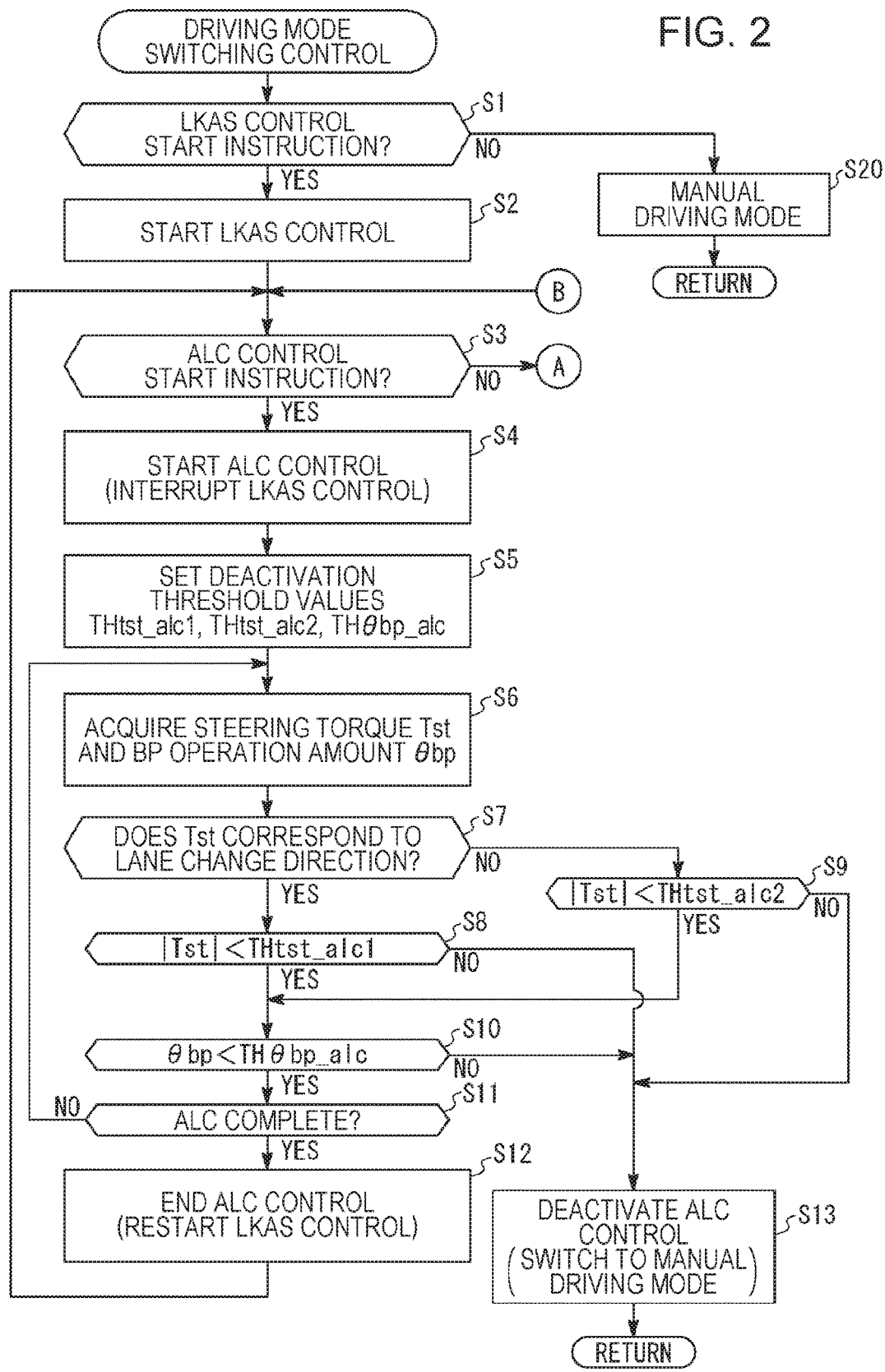
FIG. 2 is a first flowchart of driving mode switching control in the embodiment.
Figure 3:
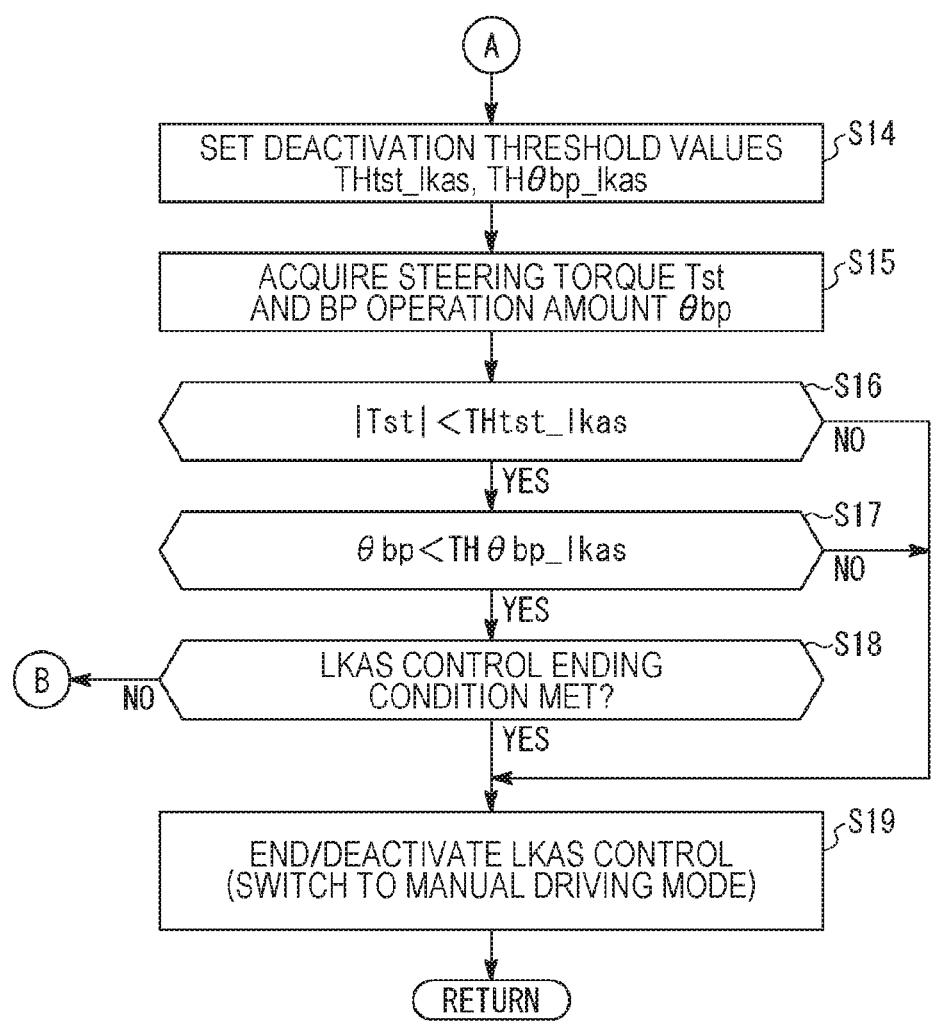
FIG. 3 is a second flowchart of driving mode switching control in the embodiment.

FIG. 2 and FIG. 3 are first and second flowcharts of driving mode switching control in the present embodiment. Each of the steps S1 to S20 in FIG. 2 and FIG. 3 is performed by the driving assistance ECU 68 (primarily by the switching controller 88).

At step S1, the switching controller 88 determines whether or not an LKAS control start instruction has been input. In other words, for example, the switching controller 88 determines that an LKAS control start instruction has been given in cases in which the LKAS switch 66 has changed from OFF to ON. Alternatively, an LKAS control start instruction may be given by audio input. When an LKAS control start instruction has been given (S1: YES), at step S2, the switching controller 88 instructs the LKAS controller 64 to start LKAS control. The LKAS controller 84 starts LKAS control on receipt of this instruction.

At step S3, the switching controller 88 determines whether or not an ALC control start instruction has been input. In other words, the switching controller 88 determines whether or not an intention of the driver to change lanes has been detected. For example, the switching controller 88 determines that an ALC control start instruction has been input (or that an intention to change lanes has been detected) in cases in which the direction indicator 20 has been operated in a left turn direction or a right turn direction in a state in which the LKAS switch 66 is ON. Alternatively, in cases in which the driver has input a rotation operation to the steering wheel 50 in a state in which the LKAS switch 66 is ON, the switching controller 88 may determine that an ALC control start instruction corresponding to the rotation direction of the steering wheel 50 has been input.

When an ALC control Start instruction has been input (S3: YES), at step S4, the switching controller 88 starts ALC control by the ALC controller 86, and interrupts LKAS control by the LKAS controller 84. Note that at step S4, if the surrounding vehicles 502, 504 are present in the lane 102 in the direction instructed by the direction indicator 20, a condition of the surrounding vehicles 502, 504 being in positions that will not obstruct lane changing may be set.

At step S5, the switching controller 88 sets ALC control deactivation threshold values THtst_alc1, THtst_alc2, THθbp_alc (also referred to as "deactivation threshold values THtst_alc1, THtst_alc2, THθbp_" below) as first deactivation threshold values. The deactivation threshold values THtst_alc1, THtst_alc2, THθbp_alc are threshold values for determining whether or not to deactivate ALC control, based on a driving operation by the driver (this being a steering wheel operation or pedal operation). The deactivation threshold values THtst_alc1, THtst_alc2 are threshold values relating to the steering torque Tst, and the deactivation threshold value THθbp_alc is a threshold value relating to the BP operation amount θbp.

The deactivation threshold value THtst_alc1 is a threshold value in a steering direction that is the same as the lane change direction of the ALC control. The deactivation threshold value THtst_alc2 is a threshold value in a steering direction opposite to the lane change direction of the ALC control. For example, in FIG. 5A, when the vehicle 10 changes lanes from the driving lane 102a to the driving lane 102b on the left side, from the perspective of the driver, turning the steering wheel 50 counterclockwise corresponds to the same steering direction as the lane change direction.

In the present embodiment, the deactivation threshold value THtst_alc1 is set larger than the deactivation threshold value THtst_alc2 (FIG. 5B). Moreover, in the present embodiment, LKAS control deactivation threshold values THtst_lkas, THθbp_lkas are smaller than the ALC deactivation threshold values THtst_alc1, THθbp_alc (FIG. 5B). ALC control is accordingly interrupted less readily than LKAS control.

In the present embodiment, the switching controller 88 sets the deactivation threshold values THtst_alc1, THtst_alc2, THθbp_alc according to the vehicle speed V. For example, the switching controller 88 sets the deactivation threshold values THtst_alc1, THtst_alc2, THθbp_alc lower the higher the vehicle speed V.

At step S6, the switching controller 88 acquires the steering torque Tst from the torque sensor 54 (or the EPS ECU 58), and acquires the BP operation amount θbp from the BP sensor 42 (or the braking ECU 46).

At step S7, determination is made as to whether or not the steering torque Tst corresponds to a lane change direction. For example, when performing automatic lane change to a lane on the left hand side, determination is made as to whether or not the steering torque Tst is in a leftward rotation direction (counterclockwise from the perspective of the driver).

When the steering torque Tst corresponds to the lane change direction (S7: YES), at step S8, the switching controller 88 determines whether or not an absolute value |Tst| of the steering torque Tst is lower than the deactivation threshold value THtst_alc1. When the absolute value of the steering torque Tst is lower than the deactivation threshold value THtst_alc1 (S8: YES), determination is made not to deactivate ALC control based on the steering torque Tst, and processing proceeds to step S10.

When the steering torque Tst does not correspond to the lane change direction (S7: NO), at step S9, the switching controller 88 determines whether or not the absolute value |Tst| of the steering torque Tst is lower than THtst_alc2. When the absolute value |Tst| of the steering torque Tst is lower than the deactivation threshold value THtst_alc2 (S9: YES), determination is made not to deactivate ALC control based on the steering torque Tst, and processing proceeds to step S10.

At step S10, the switching controller 88 determines whether or not the BP operation amount θbp is lower than the deactivation threshold value THθbp_alc. When the BP operation amount θbp is lower than the deactivation threshold value THθbp_alc (S10: YES), determination is made not to deactivate ALC control based on the Bp operation amount θbp, and processing proceeds to step S11.

At step S11, the switching controller 88 determines whether or not Automatic Lane Change (ALC) has been completed, based on a signal from the ALC controller 86. Specifically, the ALC controller 86 determines whether or not the vehicle 10 has reached a reference position Palc_ref (also referred to as the "ALC reference position Palc_ref" below) that is used during lane changing. When the vehicle 10 has reached the reference position Palc_ref, the ALC controller 86 sends the switching controller 88 a signal indicating completion of the ALC (an ALC completion signal). The switching controller 88 determines ALC to have ended when the ALC completion signal is received.

When ALC has not been completed (S11: NO), the ALC control continues, and processing returns to step S6. Note that in cases in which the deactivation threshold values THtst_alc1, THtst_alc2, THθbp_alc are to be updated, processing may return to step S5 instead of step S6.

When ALC has been completed (S11: YES), at step S12, the switching controller 88 ends the ALC control by the ALC controller 86, and restarts the LKAS control by the LKAS controller 84. After step S12, processing returns to step S3.

If any one of step S8, S9, or S10 is NO, then at step S13, the switching controller 88 deactivates (or interrupts) ALC control in the semi-automated driving mode, and transitions to the manual driving mode. This enables manual driving by the driver.

Returning to step S3, when an ALC control start instruction has not been input (or an intention of the driver to change lanes has not been detected) (S3: NO), processing proceeds to step S14 in FIG. 3.

At step S14 in FIG. 3, the switching controller 88 sets the LKAS control deactivation threshold values THtst_lkas, THθbp_lkas (also referred to as the "deactivation threshold values THtst_lkas, THθbp_lkas" below) as second deactivation threshold values. The deactivation threshold values THtst_lkas, THθbp_lkas are threshold values to determine whether or not to deactivate LKAS control based on a driving operation by the driver (this being a steering wheel operation or pedal operation). The deactivation threshold value THtst_lkas is a threshold value relating to the steering torque Tst, and the deactivation threshold value THθbp_lkas is a threshold value relating to the BP operation amount θbp.

In the present embodiment the switching controller 88 sets the deactivation threshold values THtst_lkas, THθbp_lkas according to the vehicle speed V. For example, the switching controller 88 sets the deactivation threshold values THtst_lkas, THθbp_lkas lower the higher the vehicle speed V.

At step S15, the switching controller 88 acquires the steering torque Tst from the torque sensor 54 or the EPS ECU 58), and acquires the BP operation amount θbp from the BP sensor 42 (or the braking ECU 46).

At step S16, the switching controller 88 determines whether or not the absolute value |Tst| of the steering torque Tst is lower than the deactivation threshold value THtst_lkas. When the absolute value |Tst| of the steering torque Tst is lower than the deactivation threshold value THtst_lkas (S16: YES), determination is made not to deactivate LKAS control based on the steering torque Tst, and processing proceeds to step S17.

At step S17, the switching controller 88 determines whether or not the BP operation amount θbp is lower than the deactivation threshold value THθbp_lkas. When the BP operation amount θbp is lower than the deactivation threshold value THθbp_lkas (S17: YES), determination is made not to deactivate LKAS control based on the BP operation amount θbp, and processing proceeds to step S18.

At step S18, determination is made as to whether or not an LKAS control ending condition has been met. The LKAS control ending condition referred to here is a condition for ending LKAS control other than due to a steering wheel operation or a pedal operation by the driver (in other words, other than through step S16 or S17). For example, the LKAS switch 66 being turned OFF may be an LKAS control ending condition at step S18. Moreover, becoming unable to recognize the driving lane 102 of the vehicle 10 from the lane markings 104a, 104b, 104c with the LKAS controller 84 may also be included as an LKAS control ending condition.

When the LKAS control ending condition has not been met (S18: NO), processing returns to step S3 in FIG. 2 and the LKAS control continues. When the absolute value |Tst| of the steering torque Tst is not lower than the deactivation threshold value THtst_lkas (S16: NO), or when the BP operation amount θbp is not lower than the deactivation threshold value THθbp_lkas (S17: NO), or when the LKAS control ending condition has been met (S18: YES), processing proceeds to step S19.

At step S19, the switching controller 88 ends or deactivates (interrupts) the LKAS control in the semi-automated driving mode and transitions to the manual driving mode. This thereby enables manual driving by the driver.

Returning to step S1 in FIG. 2, when a LKAS control start instruction has not been input (S1: NO), the switching controller 88 selects the manual driving mode at step S20.

A-2-5. Comparison Between the Present Embodiment and Comparative Examples 1 to 3

Figure 4A:
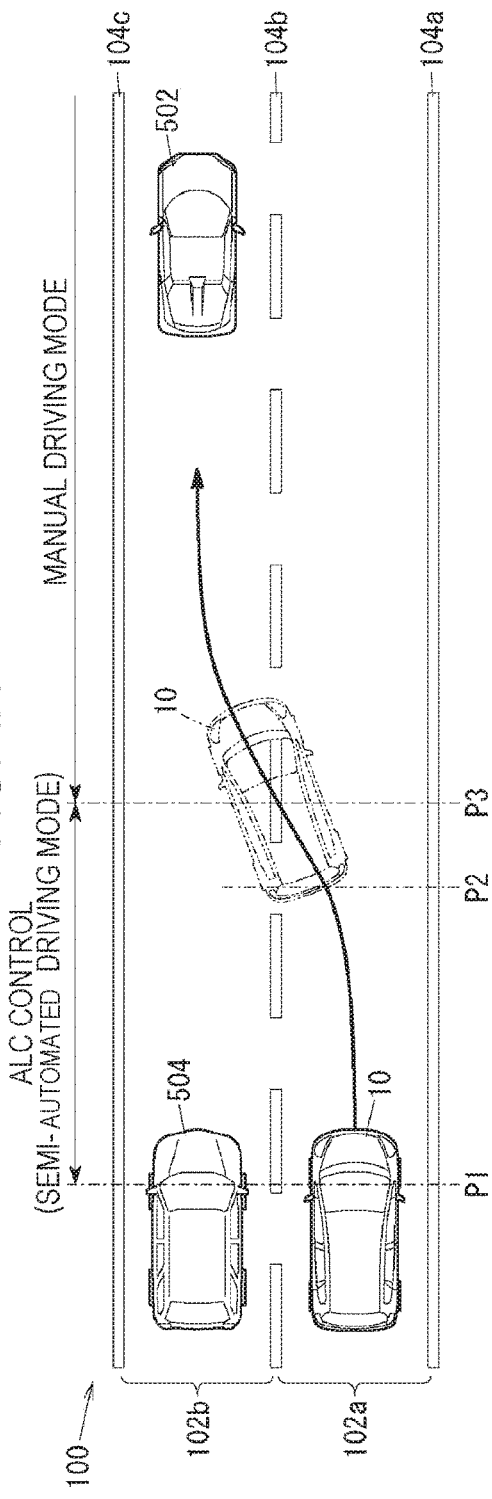
FIG. 4A is a diagram illustrating an example of a scenario during Automatic Lane Change (ALC) in Comparative Example 1, with the driving lane on the left hand side of the vehicle as a target lane.
Figure 4B:
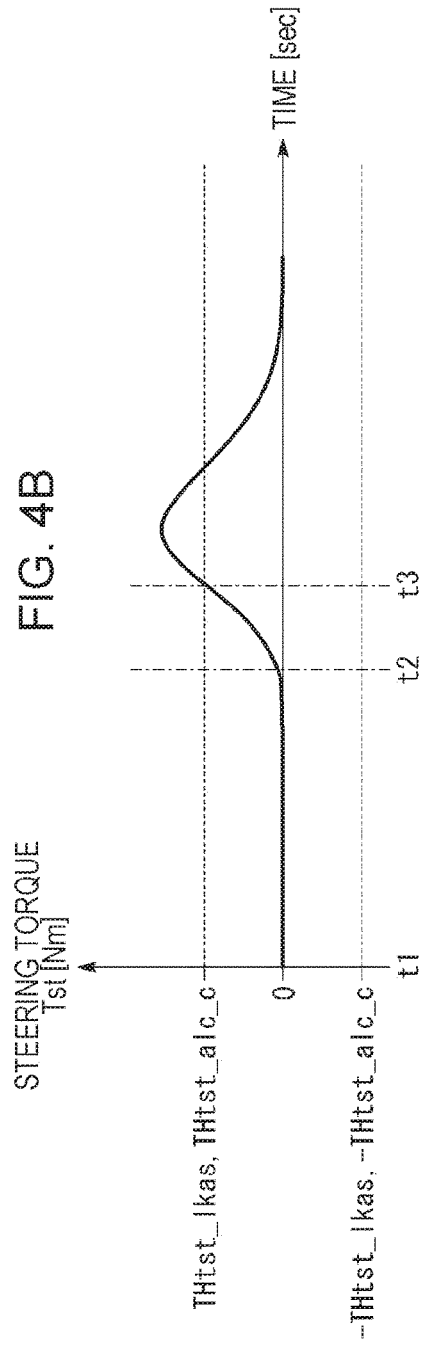
FIG. 4B is a diagram illustrating an example of an ALC control deactivation threshold value and an LKAS control deactivation threshold value in Comparative Example 1.

A-2-5-1. ALC Deactivation Threshold Values THtst_alc1, THtst_alc2 Relating to Steering Torque Tst FIG. 4A illustrates an example of a scenario during Automatic Lane Change (ALC) in Comparative Example 1, with the driving lane 102b on the left hand side or the vehicle 10 as a target lane 102tar. FIG. 4B illustrates an example of an ALC control deactivation threshold value THtst_alc_c and the LKAS control deactivation threshold value THtst_lkas in Comparative Example 1. FIG. 5A illustrates an example of a scenario during ALC in the present embodiment, with the lane 102b on the left hand side of the vehicle 10 as the target lane 102tar. FIG. 5B illustrates an example of the ALC control deactivation threshold values THtst_alc1, THtst_alc2 and the LKAS control deactivation threshold value THtst_lkas in the present embodiment. The LKAS control deactivation threshold value THtst_lkas in Comparative Example 1 is the same as the LKAS control deactivation threshold, value THtst_lkas of the present embodiment.

FIG. 4A and FIG. 5A illustrate the driving lanes 100, including the plural driving lanes 102a, 102b. The driving lane 102a is demarcated by the lane markings 104a, 104b, and the driving lane 102b is demarcated by the lane markings 104b, 104c.

In FIG. 4A and FIG. 5A, the driving lane 102a is the initial driving lane of the vehicle 10. Later, due to the Automatic Lane Change (ALC), the driving lane 102b becomes the driving lane of the vehicle 10. The new driving lane 102b is the target driving lane 102 of the ALC control (also referred to as the "target lane 102tar" below) during ALC.

In FIG. 4A and FIG. 5A, the vehicle 10 is attempting to enter between the surrounding vehicles 502, 504 in the target lane 102tar. Note that in order to facilitate understanding, in FIG. 4A and FIG. 5A, a state is envisaged in which the surrounding vehicles 502, 504 are stationary. In reality, however, the vehicle 10 enters between the surrounding vehicles 502, 504 in a state in which the vehicle 10 and the surrounding vehicles 502, 504 are moving.

In FIG. 4B and FIG. 5B, ALC control is started at a location P1, corresponding to a timing t1. At a timing t2 (location P2), the driver applies a steering torque Tst in order to make a small adjustment to the position at which the vehicle 10 will enter between the surrounding vehicles 502, 504.

Comparative Example 1 employs the ALC control deactivation threshold value THtst_alc_c relating to the steering torque Tst. In Comparative Example 1, absolute values of the deactivation threshold value THtst_alc_c are equal in a direction corresponding to the ALC direction (in the ALC direction), and in the opposite direction to the ALC direction. Moreover, in Comparative Example 1, the ALC control deactivation threshold value THtst_alc_c is equal to the LKAS control deactivation threshold value THtst_lkas.

When the driver applies additional steering torque Tst at the timing t2 (location P2), the steering torque Tst exceeds the deactivation threshold value THtst_alc_c at a timing t3 (location P3). Accordingly, ALC control (the semi-automated driving model is deactivated to transition to the manual driving mode, regardless of fact that the driver's intention was to make a small steering adjustment, rather than to deactivate the ALC control.

However, in the present embodiment, the ALC control deactivation threshold value THtst_alc1 is set to a higher value than the LKAS control deactivation threshold value THtst_lkas (FIG. 5B). Accordingly, during ALC, the steering torque Tst does not exceed the deactivation threshold value THtst_alc1 even if the driver makes a small adjustment to the steering wheel 50 at the timing t2 (location P2) onwards. Accordingly, the driver is able to make small steering adjustments without interrupting the ALC control. Moreover, when the vehicle 10 reaches the ALC reference position Palc_ref and ALC control is ended (S11: YES in FIG. 2), LKAS control can be restarted without first reverting to the manual driving mode (S12).

A-2-5-2. ALC Deactivation Threshold Value THθbp_alc Relating to BP Operation Amount θbp (During ALC)

FIG. 6A illustrates an example of a scenario during Automatic Lane Change (ALC) in Comparative Example 2, with the driving lane 102b on the left hand side of the vehicle 10 as the target lane 102tar. FIG. 6B illustrates an example of an ALC control deactivation threshold value THθbp_alc_c in Comparative Example 2. FIG. 7A illustrates an example of a scenario during Automatic Lane Change (ALC) in the present embodiment, with the driving lane 102b on the left hand side of the vehicle 10 as the target lane 102tar. FIG. 7B illustrates an example of the ALC control deactivation threshold value THθbp_alc of the present embodiment.

In Comparative Example 2, the ALC control deactivation threshold value THθbp_alc_c and the LKAS control deactivation threshold, value THθbp_lkas are equal. In the present embodiment, the ALC control deactivation threshold value THθbp_alc is larger than the LKAS control deactivation threshold value THθbp_lkas. The LKAS control deactivation threshold value THθbp_lkas of Comparative Example 2 is the same as the LKAS control deactivation threshold value THθbp_lkas of the present embodiment.

In FIG. 6A and FIG. 7A, the vehicle 10 is attempting to the move to the rear of the surrounding vehicle 502 in the target lane 102tar. In FIG. 6B and FIG. 7B, ALC control is started at a location P11. Ahead of a location P12, the driver starts pressing the brake pedal 40 in order to make a small adjustment to the position where the vehicle 10 will move to the rear of the surrounding vehicles 502 (leading vehicle). There is a corresponding increase in the BP operation amount θbp. At the location P12, the BP operation amount θbp exceeds the deactivation threshold value THθbp_alc, such that the result illustrated in FIG. 6B ensues.

As described above, the BP operation amount θbp exceeds the deactivation threshold value THθbp_alc_c at the location P12 in FIG. 6A. Accordingly, ALC control (the semi-automated driving mode) is deactivated to transition to the manual driving mode, regardless of fact that the driver's intention was to make a small deceleration adjustment, rather than to deactivate the ALC control.

By contrast, in the present embodiment, the ALC control deactivation threshold value THθbp_alc is set to a larger value than the LKAS control deactivation threshold value (FIG. 7B). Accordingly, during ALC, the BP operation amount θbp does not readily exceed the deactivation threshold value THθbp_alc, even when the driver makes a small adjustment to the brake pedal 40 before the location P12. The driver is thus able to make small deceleration adjustments without interrupting the ALC control. Moreover, when the vehicle 10 reaches the ALC reference position Palc_ref and ALC control is ended (S11: YES in FIG. 2), LKAS control can be restarted without first reverting to the manual driving mode (S12). Note that the BP operation amount θbp in FIG. 7B illustrates an example using the same values at the same timings as in FIG. 6B.

A-2-5-3. Positioning for ALC

FIG. 8A illustrates an example of a scenario during positioning of the vehicle 10 in the current driving lane 102a in order to perform ALC in Comparative Example 3. FIG. 8B illustrates an example of a scenario during positioning of the vehicle 10 in the current driving lane 102a in order to perform ALC in the present embodiment. In FIG. 8A and FIG. 8B, the surrounding vehicles 502, 504 are traveling at 60 km/h. In Comparative Example 3 and the present embodiment, the ALC controller 86 reduces the speed from 70 km/h to 60 km/h and attempts to move the vehicle 10 in between the surrounding vehicles 502, 504.

Similarly to in Comparative Example 2, in Comparative Example 3, the ALC deactivation threshold value THθbp_alc_c is equal to the LKAS deactivation threshold value THθbp_lkas. A driver who is aware of this fact does not operate the brake pedal 40 when positioning for ALC. Accordingly, a deceleration force Fb (N) generated in the vehicle 10 includes only an ALC braking power Fb_alc generated by the ALC controller 86.

By contrast, in the present embodiment, the ALC deactivation threshold value THθbp_alc is larger than the LKAS deactivation threshold value THθbp_lkas. A driver who is aware of this fact is able to make small adjustments to the brake pedal 40 when positioning for ALC. Accordingly, the deceleration force Fb generated in the vehicle 10 includes the ALC braking power Fb_alc generated by the ALC controller 86, and a driver braking power Fb_dr generated by the driver operating the brake pedal 40.

A-3. Advantageous Effects of the Present Embodiment

As described above, in the present embodiment, the deactivation threshold values THtst_alc1, THtst_alc2, THθbp_alc (first deactivation threshold values) for determining whether or not to deactivate ALC control during Automatic Lane Change (ALC) control, and the deactivation threshold, values THtst_lkas, THθbp_lkas (second deactivation threshold values) for determining whether or not to deactivate LKAS control during LKAS control (second driving assistance control) are different from each other (FIG. 5B, FIG. 7B). This thereby enables more appropriate deactivation timings to be set for ALC control and LKAS control.

In the present embodiment, the overall driving assistance system 12 includes the forward camera 60 (imaging device) that acquires the forward images Icf of the vehicle 10, the lane marking recognition section 82 (lane marking detection section) that detects the lane markings 104a, 104b, 104c from the forward images Icf, and the LKAS controller 84 (lane keeping controller, second driving assistance controller) that performs LKAS control (lane keeping control, second driving assistance control) based on the lane markings 104a, 104b, 104c detected by the lane marking recognition section 82 (FIG. 1).

The switching controller 88 (deactivation controller) sets the deactivation threshold values THtst_alc1, THtst_alc2, THθbp_alc higher than the deactivation threshold values THtst_lkas, THθbp_lkas (FIG. 5B, FIG. 7B).

The ALC control is therefore deactivated less readily than the LKAS control. This thereby enables ALC to be continued while permitting small adjustments by the driver to steering, or to acceleration or deceleration, to a greater extent during ALC than during LKAS control (see FIG. 4A, FIG. 5A, FIG. 6A, FIG. 7A).

In the present embodiment, the control amounts u that determine deactivation of ALC control or LKAS control are the steering torque Tst and the BP operation amount θbp (operation amount of the brake pedal 40) (S8, S9, S10 in FIG. 2, S16, S17 in FIG. 3, FIG. 5B, FIG. 7B). This thereby enables ALC control (first driving assistance control) or LKAS control (second driving assistance control) to be deactivated according to direct operation of the steering wheel 50 or the brake pedal 40 by the driver.

In the present embodiment, the control amounts u that determine deactivation of ALC control or LKAS control include the steering torque Tst (S8, S9 in FIG. 2, S16 in FIG. 3, FIG. 5B). The switching controller 88 (deactivation controller) sets the absolute value of the deactivation threshold value THtst_alc2 (first deactivation threshold value) for a different direction to the lane change smaller than the absolute value of the deactivation threshold value THtst_alc1 (first deactivation threshold value) for the same direction as the lane change (FIG. 5B). This thereby enables ALC control to be deactivated more easily when the driver washes to move against the ALC controller 86 (first driving assistance controller) that performs ALC control.

B. Modified Example

Note that the present disclosure is not limited by the embodiment above, and obviously various configurations may be adopted based on the material disclosed herein. For example, the following configurations may be adopted.

B-1. Applicability

In the above embodiment, the driving assistance system 12 is applied to the vehicle 10 (FIG. 1). However, there is no limitation thereto, and application may be made in other fields. For example, the driving assistance system 12 may be applied to a robot. In such cases, a moving object ahead may take the place of the surrounding vehicles 502, 504.

B-2. Driving Assistance System 12 Configuration

In the embodiment above, the forward camera 60 (camera information Ic) and the radar 62 (radar information Ir) are employed to detect the objects 500 ahead of the vehicle 10 (FIG. 1). However, for example, from the perspective of detecting the objects 500, there is no limitation thereto. For example, either one of the forward camera 60 or the radar 62 may be employed alone in order to detect the objects 500.

In the embodiment above, the LKAS controller 84, the ALC controller 86, and the switching controller 88 are included in the single driving assistance ECU 68 (FIG. 1). However, for example, from the perspective of having different deactivation threshold values for the ALC control and the other driving assistance control (second driving assistance control), there is no limitation thereto. For example, the LKAS controller 84, the ALC controller 86, and the switching controller 88 may be included in separate Electronic Control Units (ECUs).

B-3. Driving Assistance ECU 68 Control

In the embodiment above, explanation has been given in which the ALC control deactivation threshold values THtst_alc1, THtst_alc2, THθbp_alc are different to the LKAS control deactivation threshold values THtst_lkas, THθbp_lkas (FIG. 2, FIG. 3, FIG. 5B, FIG. 7B). However, for example, from the perspective of having different deactivation threshold values for the ALC control and the other driving assistance control (second driving assistance control), there is no limitation thereto. For example, ALC control may have different deactivation threshold values to automatic cruise control (ACC) or lane departure prevention control.

The LKAS control automatically controls the steering angle θst, whereas ACC automatically controls acceleration and deceleration. Moreover, the LKAS control controls the vehicle 10 such that it aligns with the reference position Plkas_ref in the driving lane 102. By contrast, lane departure prevention control is control to move the vehicle 10 in the opposite direction to a departure direction when the vehicle 10 has departed or appears to be about to depart from the driving lane 102.

The ALC control and the LKAS control of the above embodiment are interspersed with driver operation. However, from the perspective of switching from the ALC control and the LKAS control to the manual driving mode, there is no limitation thereto. For example, the ALC control and the LKAS control (or the ACC) may be employed in fully automated driving control.

In the above embodiment, the ALC control deactivation threshold values THtst_alc1, THtst_alc2, THθbp_alc are set larger than the LKAS deactivation threshold values THtst_lkas, THθbp_lkas (FIG. 5B, FIG. 7B). However, for example, from the perspective of having different deactivation threshold values for the ALC control and the other driving assistance control (second driving assistance control), the ALC control deactivation threshold values THtst_alc1, THtst_alc2, THθbp_alc may be set smaller than the LKAS deactivation threshold values THtst_lkas, THθbp_lkas.

In the above embodiment, the absolute value of the deactivation threshold value THtst_alc1 in the ALC direction is set larger than the absolute value of the deactivation threshold value THtst_alc2 in the opposite direction to the ALC direction (FIG. 5B). However, for example, from the perspective of setting the ALC control deactivation threshold values THtst_alc1, THtst_alc2 larger than the LKAS deactivation threshold value THtst_lkas, there is no limitation thereto. For example, the deactivation threshold value THtst_alc1 in the ALC direction may be set smaller than the deactivation threshold value THtst_alc2 in the opposite direction to the ALC direction. Alternatively, the deactivation threshold values THtst_alc1, THtst_alc2 may be equal to each other. Alternatively, from the perspective of making one out of the ALC control deactivation threshold values THtst_alc1, THtst_alc2 different to the LKAS control deactivation threshold value THtst_lkas, the other out of the ALC control deactivation threshold values THtst_alc1, THtst_alc2 may be omitted.

In the examples of FIG. 5A, FIG. 7A and FIG. 8B, the lane markings 104a, 104b, 104c are envisaged as being white lines on the road (continuous lines and intermittent lines). However, for example, from the perspective of the lane markings 104a, 104b, 104c that define the driving lane 102 and the target lane 102 tar, there is no limitation thereto. For example, the lane markings 104a, 104b, 104c may be yellow lines, Botts Dots, or cats' eyes. Alternatively, the lane markings 104a, 104b, 104c may be a guard rail itself, or virtual lane markings 104 set at a specific distance from a guard rail.

In the above embodiment, the steering torque Tst and the BP operation amount θbp are employed as examples of the control amounts u for determining deactivation of the ALC control or the LKAS control (FIG. 2, FIG. 3, FIG. 5B, FIG. 7B). However, for example, from the perspective of determining deactivation of the ALC control (first driving assistance control) or the LKAS control (second driving assistance control) (in other words, from the perspective of determining whether or not the driver wants to deactivate the driving assistance control based on their driving operation), there is no limitation thereto.

For example, one out of the steering torque Tst or the BP operation amount θbp may be employed alone as the control amount u. Alternatively, an operation speed Vst (time derivative value of the steering angle θst) or an operation acceleration rate (time derivative value of the operation speed Vst) of the steering wheel 50 may be employed. Alternatively, an operation speed Vbp (time derivative value of the BP operation amount θbp) or an operation acceleration rate (time derivative value of the operation speed Vbp), ox a pressing force, of the brake pedal 40 may be employed as the control amount u. Alternatively, the operation amount θap or an operation speed Vap (time derivative value of the AP operation amount θap), or an operation acceleration rate (time derivative value of the operation speed Vap), or a pressing force, of the accelerator pedal 32 may be employed.

In the above embodiment, deactivation ox the ALC control or the LKAS control is determined principally by the switching controller 88 (FIG. 2 and FIG. 3). However, for example, from the perspective of determining deactivation of the ALC control or the LKAS control (second driving assistance control) (in other words, from the perspective of determining whether or not the driver wants to deactivate the driving assistance control based on their driving operation), there is no limitation, thereto. For example, deactivation determination for ALC control may be made by the ALC controller 86, and deactivation determination for LKAS control may be made by the LKAS controller 84.

In the embodiment above, the LKAS reference position Plkas_rel and the ALC reference position Palc_ref are employed. However, the reference positions Plkas_ref, Palc_ref may be employed as reference regions (target regions).

In the above embodiment, the deactivation threshold values THtst_alc1, THtst_alc2, THθbp_alc are variable values (S5 in FIG. 2, S14 in FIG. 3). However, for example, from the perspective of having different deactivation threshold values for the ALC control (first driving assistance control) and the LKAS control second driving assistance control), the respective deactivation threshold values THtst_alc1, THtst_alc2, THθbp_alc for ALC control may be fixed values. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A driving assistance device comprising:
   a first driving assistance controller that executes first driving assistance control of automatic lane change control so as to perform lane changing automatically when a driver's intention to change lanes has been detected;
   a second driving assistance controller that executes second driving assistance control of different driving assistance control from the automatic lane change control; and
   a deactivation controller that controls so as to deactivate the automatic lane change control and the second driving assistance control,
   wherein the deactivation controller:
   deactivates the automatic lane change control when a control amount by the driver of a steering wheel, a brake pedal, or an accelerator pedal has exceeded a first deactivation threshold value during automatic lane change control;
   deactivates the second driving assistance control when the control amount has exceeded a second deactivation threshold value during the second driving assistance control;
   sets the first deactivation threshold value and the second deactivation threshold value so as to differ from each other; and
   adjusts the first deactivation threshold value to a lower value as a vehicle speed becomes higher.

2. The driving assistance device of claim 1, further comprising:
   an imaging device that acquires a forward image in front of a vehicle installed with the imaging device; and
   a lane marking detection section that detects a lane marking in the forward image, wherein
   the second driving assistance control is lane keeping control to keep the vehicle in a driving lane by using the lane marking detected by the lane marking detection section,
   the second driving assistance controller is a lane keeping controller that executes the lane keeping control, and
   the deactivation controller sets the first deactivation threshold value higher than the second deactivation threshold value.

3. The driving assistance device of claim 1, wherein the control amount is:
   a steering torque, an operation speed, or an operation acceleration of the steering wheel; or
   an operation amount, an operation speed, an operation acceleration, or a pressing force of the brake pedal; or
   an operation amount, an operation speed, an operation acceleration, or a pressing force of the accelerator pedal.

4. The driving assistance device of claim 1, wherein:
   the control amount is a control amount of the steering wheel; and
   the deactivation controller sets the first deactivation threshold value for the control amount of the steering wheel in both directions of the same direction as the lane change and the opposite direction to the lane change, and
   the first deactivation threshold value for the same direction is larger than the first deactivation threshold value for the opposite direction.

5. The driving assistance device of claim 2, wherein the lane keeping controller suspends the lane keeping control when the driver's intention to change lanes has been detected.

6. The driving assistance device of claim 5, wherein the lane keeping controller resumes the suspended lane keeping control when the automatic lane change is completed.

7. A driving assistance method comprising steps of:
   executing, by a computer, a first driving assistance control of automatic lane change control so as to perform lane changing automatically when a driver's intention to change lanes has been detected;
   executing, by the computer, a second driving assistance control of different driving assistance control from the automatic lane change control;
   deactivating, by the computer, the automatic lane change control when a control amount by the driver of a steering wheel, a brake pedal, or an accelerator pedal has exceeded a first deactivation threshold value during automatic lane change control; and
   deactivating, by the computer, the second driving assistance control when the control amount has exceeded a second deactivation threshold value during the second driving assistance control; and
   wherein the first deactivation threshold value and the second deactivation threshold value are set to be different from each other; and
   adjusting, by the computer, the first deactivation threshold value to a lower value as a vehicle speed becomes higher.

8. The driving assistance device of claim 1, wherein, after the driver's intention to change lanes has been detected, the deactivation controller starts using the first deactivation threshold value for the control amount by the driver of the brake pedal at a time when positioning a vehicle in forward-backward direction for the automatic lane change control.

9. The driving assistance device of claim 1, wherein:
   the control amount is a control amount of the brake pedal; and
   during a time when the automatic lane change control is performed, the deactivation controller adjusts the first deactivation threshold value for the control amount by the driver of the brake pedal to a higher value when a vehicle is decelerated.

* * * * *